Figure 1:
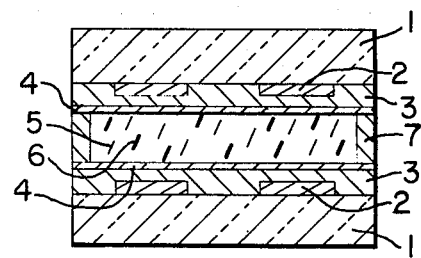

United States Patent [19]

Tatsumichi et al.

[11] 4,402,999

[45] Sep. 6, 1983

[54] METHOD OF PREPARATION OF SUBSTRATES FOR LIQUID CRYSTAL DISPLAY DEVICES

[75] Inventors: Toshio Tatsumichi, Ando; Hiroshi Kawarada, Hirakata, both of Japan

[73] Assignee: Matsushita Electric Industrial Co., Ltd., Osaka, Japan

[21] Appl. No.: 266,053

[22] Filed: May 21, 1981

[30] Foreign Application Priority Data

May 22, 1980 [JP] Japan ................................. 55-68609
May 22, 1980 [JP] Japan ................................. 55-68610
May 27, 1980 [JP] Japan ................................. 55-71049

[51] Int. Cl.³ ............................................. B05D 5/12
[52] U.S. Cl. ................................. 427/126.3; 427/108; 427/299; 427/322; 427/355; 427/407.1; 428/1
[58] Field of Search .............. 427/58, 126.3, 355, 427/407.1, 343, 344, 299, 322, 108; 428/1

[56] References Cited

U.S. PATENT DOCUMENTS

| 3,728,008 | 4/1973 | Allan et al. ........................... 428/1 |
| 3,854,793 | 12/1974 | Kahn .................................... 428/1 |
| 3,941,901 | 3/1976 | Harsch .................................. 427/108 |
| 3,994,567 | 11/1976 | Matsuo et al. ......................... 428/1 |
| 4,151,326 | 4/1979 | Funada et al. ......................... 428/1 |
| 4,224,093 | 9/1980 | Kohyama et al. ...................... 428/1 |
| 4,297,401 | 10/1981 | Chern et al. .......................... 428/1 |

*Primary Examiner*—Norman Morgenstern
*Assistant Examiner*—Richard Bueker
*Attorney, Agent, or Firm*—Wenderoth, Lind & Ponack

[57] ABSTRACT

A method is provided for the preparation of an electrode substrate for use in a liquid display device utilizing perpendicular alignment of liquid crystal and dichroic dye molecules. In the improved method, a base substrate bearing an electrode film is coated with an insulating film on the surface which contacts the liquid crystal. The insulating film is rubbed with cloth in a fixed direction and following the rubbing treatment, the rubbed surface is treated with a silane surfactant so that when the electrode substrate is employed in a liquid crystal display device, the liquid crystal and dye molecules are arranged in the direction of the major axes thereof in substantially perpendicular orientation at constant tilt angles in the same direction on the interface with said electrode substrate.

4 Claims, 2 Drawing Figures

METHOD OF PREPARATION OF SUBSTRATES FOR LIQUID CRYSTAL DISPLAY DEVICES

This invention relates to a method of perpendicular alignment preparation of liquid crystal molecules for manufacturing a liquid crystal display device.

Generally, in the liquid crystal display device, a molecular configuration at the substrate interface of liquid crystal, as is well known, includes a parallel alignment orienting the molecule's major axes in parallel to the substrate surface, and a perpendicular alignment orienting the major axes perpendicularly to the substrate surface. Regarding the parallel alignment, it is well-known that when liquid crystal is sandwiched between a pair of substrates of glass coated with polyimide film, which are rubbed in a fixed direction with cotton cloth or the like, liquid crystal molecules orient at the major axes thereof in parallel to the substrate surface. Such parallel alignment of liquid crystal molecules is applied mainly to a TN type or negative display guest-host type liquid crystal display device.

On the other hand, the perpendicular alignment is necessary for obtaining: (1) a guest-host type liquid crystal display device using a mixture of nematic liquid crystal with negative dielectric anisotropy and a dichroic dye or the nematic liquid crystal with negative dielectric anisotropy containing a small amount of optically active material, and a dichroic dye; (2) a guest-host type (White-Taylor type) using a mixture of nematic liquid crystal with positive dielectric anisotropy and a dichroic dye, thereby utilizing a cholesteric nematic phase transition effect; or (3) an electrically controlled birefringence type liquid crystal display device using nematic liquid crystal with the positive or negative dielectric anisotropy.

For example, the so-called positive display guest-host type liquid crystal display device, in which digits are displayed in colored conditions and the background is in decolored condition, has a cell comprising two electrode substrates prepared uniformly for perpendicular alignment, the cell enclosing therein a mixture of nematic liquid crystal with negative dielectric anisotropy and a dichroic dye, or a mixture of nematic liquid crystal with negative dielectric anisotropy containing a small amount of optically active material and a dichroic dye.

In this instance, the liquid crystal and dye molecules in the cell, when no voltage is applied, must be aligned perpendicularly with respect to the surfaces of electrode substrate, but when voltage is applied, the liquid crystal and dye molecules should turn from the fixed direction to be disposed in parallel to the substrate surfaces so as not to degrade display characteristics, such as a contrast and uniformity. For that purpose, the liquid crystal and dye molecules need to be tilted previously only at a small angle in a fixed direction from perpendicular orientation.

Conventionally, the method to align the liquid crystal molecules in perpendicular orientation has been proposed by; (1) Japanese Patent Publication No. Sho 53-144768 (West Germany Patent (DE) No. P 2722900) which disclosed that substrates are coated with an organic solution including a metal (Al or Cr) and silicon and then thermally-decomposed at a high temperature, thereby forming an alignment film comprising metallic oxide (like $Al_2O_3$) and silicon oxide; (2) a lecithin coating method; or (3) a method of preparing the substrates merely by a silane surfactant. Such methods, however, align the liquid crystal only in perpendicular orientation with respect to the substrate surfaces, but cannot give a small tilt grade (pretilt) from perpendicular orientation to the alignment of liquid crystal molecules, so that a defect is created which causes a nonuniform display when voltage is applied.

A method for perpendicular alignment with small tilt is well-known. The preparation, by use of a silane surfactant, of the substrates applied with oblique deposition of $MgF_2$ by vacuum evaporation, in combination with addition of perpendicular alignment agent to the liquid crystal, or deposition of $CaF_2$ of LiF by vacuum evaporation. Such method, however, has a difficulty in controlling the film forming condition, such as the deposition angle or film thickness in the oblique evaporation, thereby causing an unstable reproducibility. Also, in the case of adding the alignment agent into the liquid crystal, the property of liquid crystal is deteriorated over long-time use.

This invention has been designed to eliminate such conventional defects. An object of the invention is to provide a method of preparation of a substrate for manufacturing a liquid crystal display device, which aligns liquid crystal and dye molecules, at the interface with electrode substrates, uniformly in perpendicular orientation with a tilt angle (pretilt) in the fixed direction from the normal to the substrate surface, thereby obtaining a superior display characteristics.

This invention is characterized in that the surface of an insulator film provided at the surface of the electrode substrate is rubbed in the fixed direction with cloth and then the film surface is prepared by a solution of silane surfactant. Consequently the liquid crystal and dye molecules can be aligned so that they are tilting at small angle in the fixed direction from the normal with respect to the surface of substrate.

Figure 2:
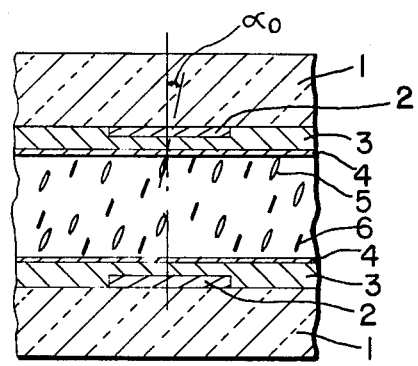

These and other objects, features and advantages of the invention will become more apparent upon a reading of the following detailed description and drawings, in which FIG. 1 is a sectional side view of an embodiment of the invention, and FIG. 2 is a view explanatory of the primary alignment condition of liquid crystal and dye molecules.

First, a glass substrate with a transparent electrode film made of a compound, such as indium tin oxide, is fully cleaned and dried. Then, surface of the substrate is coated with an insulating film, such as $SiO_2$, SiO, $TiO_2$, $CeO_2$, $Al_2O_3$, $Y_2O_3$ or polyimide film, and thereafter is rubbed in the fixed direction by use of a cloth, such as cotton or various synthetic fibres.

In this instance, the method to form an insulating film, e.g., a silicon dioxide film, is that (d) the substrate is immersed in a solution including an organic silicon compound, such as $Si(OR)_4$ (R is an alkyl group) and then heated in air at 300° to 550° C. for 30 to 60 minutes, (b) that silicon dioxide is coated on the substrate by vacuum evaporation through electron beam heating, or (c) that silicon dioxide is coated by sputtering. Each of the above methods forms a silicon dioxide film of 500 to 5000 Å in thickness. A thickness smaller than 500 Å may cause uneven alignment and that over 5000 Å is not preferable because of causing higher threshold voltage of the display.

A polyimide insulating film is formed in such a manner that poly-amic acid produced by the reaction of aromatic diamine and aromatic dianhydride is dissolved by a solvent such as N-methyl-pyrrolidone, dimethyl-acetoamide and dimethyl-formamide, diluted and applied on the electrode substrate by means of rotary application, immersion, or spraying, and thereafter is heat-treated to be allowed to polymerize, thereby forming an imide bond. In this instance, the heat treatment temperature is preferred to be 200° to 350° C. The thickness of the produced polyimide film is preferred to be 0.01 to 1µ from the viewpoint of the alignment effect, response speed, and threshold voltage of the liquid crystal.

The surface of insulating film formed on the electrode substrate is rubbed with cloth in a fixed direction, the cloth suitable for use being materials such as cotton, polyester, Tetron, nylon, or these fibres including inorganic compound, such as titanium oxide.

A good result of rubbing is obtained in a range of rubbing pressure of 1 to 50 gr/cm$^2$, speed of 50 to 500 m/min, and the number of times of 5 to 50.

The surface of the substrate after rubbing-treatment as mentioned above is further treated by a silane surfactant solution diluted by an organic solvent, the silane surfactant preferred for use being octadecyl triethoxy silane or N,N-dimethyl-N-octadecyl-3-aminopropyl trimethoxy silyl chloride.

These silane surfactants are soluble in various solvents, but when octadecyl triethoxy silane is used as a surfactant, alcohol, such as isopropyl alcohol, n-propyl alcohol, ethyl alcohol, and methyl alcohol, or an organic solvent, such as trichloroethane, are suitable for obtaining the uniform perpendicular alignment of liquid crystal.

When using N,N-dimethyl-N-octadecyl-3-aminopropyl trimethoxy silyl chloride as the surfactant, water, in addition to the above solvent, is available to demonstrate a superior alignment effect.

For the purpose of surface treatment, the above surfactant is dissolved in the above solvents, into which the substrate is immersed and then dried at 100° to 170° C. for 30 to 60 minutes, thereby forming an extremely thin silane surfactant film on the surface of the rubbed insulating film on the substrate. In addition to immersion, rotational application or spraying of the surfactant solutions is available.

The surfactant density in the solution is preferred to be within a range usually of 0.01 to 5%. When it is 0.01% or less, the treatment effect is small, and when over 5%, a uniform surface treatment is difficult so as to be liable to cause uneven alignment of liquid crystal.

Next, the surfactant film drying condition is preferred to be in the atmosphere for 30 minutes at the temperature of 100° to 170° C. At temperatures of 100° C. or less or 170° C. or more, a good perpendicular alignment of liquid crystal and dye molecules is not obtainable.

A pair of electrode substrates formed by the alignment treatment as described are disposed opposite to each other at a given spacing and at the outer periphery of each substrate there is applied epoxy resin. The substrates are stuck to be assembled into a cell.

Thereafter, into the cell is enclosed a display material for the aforesaid guest-host type or electrically controlled birefringence type device, thereby completing the desired liquid crystal display device.

For example, in the case of producing the positive display guest-host type liquid crystal display device, the nematic liquid crystal with negative dielectric anisotropy, or mixed liquid crystal of the above nematic liquid crystal containing a small amount of an optically active material to give a slightly spiral construction, is mixed with a dichroic dye, thereby completing the display device.

In the display device completed as abovementioned, the enclosed liquid crystal and dye molecules are disposed uniformly at smaller tilt angles in a fixed direction with respect to the normal to the substrate. This is because the insulating film on the substrate is rubbed so that the molecules are aligned at constant smaller tilt angles with respect to the substrate surface in the rubbing direction at the interface. It is assumed that the film further treated with the surfactant allows the molecules to be kept in the perpendicular orientation with respect to the surface and the perpendicular orientation at smaller tilt angles results in a condition of aligning the molecules in a fixed direction slightly tilting from the normal.

Thus, this invention comprises a combination of processes steps of providing the insulating film on the electrode substrate, rubbing it, and thereafter treating the surface with a silane surfactant solution, thereby achieving a superior perpendicular alignment effect.

For this purpose, the insulating film is effective to obtain a uniform, stable and good alignment effect. If the rubbing process is omitted, liquid crystal and dye molecules are not disposed at smaller tilt angles and in a fixed direction with respect to the normal of substrate, resulting in that an uneven display is created during the voltage application. When the rubbing is carried out after the silane surfactant treatment, uniform alignment is not obtainable. Furthermore, when no silane surfactant treatment is applied, the liquid crystal and dye molecules are not in perpendicular alignment with respect to the substrate surface.

The effect of the invention will be described in accordance with an example of the positive display guesthost type display device using the nematic liquid crystal with negative dielectric anisotropy containing the optically active material and dichroic dye.

This display device, in the condition of applying no voltage, has the liquid crystal and dye molecules orienting substantially perpendicularly with respect to the substrate surface, thereby scarcely absorbing light, thus obtaining a bright condition of no color display.

On the other hand, when voltage is applied, liquid crystal and dye molecules each are disposed in parallel and in a uniform continuous spiral shape, thereby obtaining a sufficient colored condition without uneven display.

This is because the method of the invention, in the primary alignment condition, previously allows the liquid crystal and dye molecules to be in perpendicular orientation at smaller tilt angles in the fixed direction with respect to the normal of the substrate on the interface thereto. Hence, the dye molecules together with color ones, when applying voltage, change to parallel orientation in a continuous spiral shape from the above tilted direction.

In contradistinction, in the case of perpendicular orientation without such tilting, when voltage is applied, the molecules cannot obtain the continuous spiral and parallel orientation, resulting in uneven display in the colored condition. As seen from the above, the alignment treatment method of the invention demonstrates an effect superior in an improvement of display characteristic of the liquid dislay device utilizing the perpendicular alignment.

Next, an embodiment of the invention will be detailed.

FIG. 1 is a view explanatory of a first embodiment of the invention, in which a glass substrate 1 provided with a transparent electrode 2 comprising an indium tin oxide film is fully cleaned and dried. Thereafter, substrate 1 is provided with a silicon monoxide film 3 of 150 Å in thickness. This film is made of silicon monoxide coated by vacuum evaporation in the direction of the normal to the substrate. Next, the surface of film 3 is rubbed by use of a cloth mainly of Tetron in a fixed direction, under a pressure of 5 gr/cm$^2$, at a rubbing speed of 300 m/min, the number of times being 10.

Thereafter, the substrate is immersed for three minutes in an aqueous solution of 0.1% N,N-dimethyl-N-octadecyl-3-aminopropyl trimethoxy silyl chloride and wind-dried by nitrogen gas and then dried at 100° C. for one hour, thereby forming a thin film 4 of N,N-dimethyl-N-octadecyl-3-aminopropyl trimethoxy silyl chloride. Next, a pair of substrates 1 produced under such orientation treatment are placed opposite to each other in a parallel and reverse direction of rubbing and kept at an interval of 10μ. To substrates 1 is applied, at the outer periphery thereof, an epoxy resin adhesive 7 and the substrates are adhered and thereby assembled into a cell.

A second embodiment forms a thin film 3 of silicon dioxide in such a manner that a glass substrate 1 provided thereon with a transparent electrode 2 is applied with a solution mainly of organic silicon compound by use of the immersion process, fired in the atmosphere at 500° C. for one hour, thereby forming a silicon dioxide film 3 of 1500 Å in thickness.

Next, the surface of film 3 is rubbed similarly to the first embodiment and immersed in a solution of 0.3% 1,1,1-trichloroethane of octadecyl triethoxy silane for two minutes and then dried in the atmosphere at 150° C. for 30 minutes, thereby forming a thin film of octadecyl triethoxy silane. Thereafter, the substrates 1 are assembled into a cell similarly to the first embodiment.

A third embodiment forms a polyimide film 3 in such a manner that a glass substrate 1 provided with a transparent electrode 2 is treated by rotary-applying on the surface a N,N-dimethyl aceto-amide solution including 2.3% polymic acid and then heat-treated at 300° C. for 30 minutes to be allowed to polymerize. This forms the polymide film 3 of 0.06μ in thickness. Next, the surface of film 3, similarly to the first embodiment, is rubbed and then immersed for 3 minutes in a isopropyl alcohol solution of 0.1% N,N-dimethyl-N-octadecyl-3-aminopropyl trimethoxy silyl chloride and wind-dried by nitrogen gas and dried in the atmosphere at 100° C. for one hour, thereby forming a thin film of N,N-dimethyl-N-octadecyl-3-aminopropyl trimethoxy silyl chloride. Thereafter, the substrates 1 are assembled into a cell similarly to the first embodiment.

Into the cells of the embodiments 1 to 3 produced as above described is enclosed a mixed material of (a) nematic liquid crystal (dicyano hydroquinone mixture liquid crystal) 5 with negative dielectric anisotropy and a dichroic dye 6 of 0.8 weight-percent added with respect to the nematic liquid crystal, or (b) a mixture of nematic liquid crystal 5 with negative dielectric anisotropy added with an optical active material of 3.2 weight-percent and a dichroic dye of 0.8 weight-percent added to and mixed with the nematic liquid crystal.

The guest-host type liquid crystal display device containing no optically active material is combined with a linear polarizing plate so that its polarizing axis is parallel to the rubbing direction. The display device completed as foregoing, when no voltage is applied, has the liquid crystal and dye molecules disposed uniformly in the fixed direction in a range of a tilt angle $\alpha_o$ in relation of $0° < \alpha_o = 5°$ with respect to the normal to the substrate.

Therefore, portions applied with no voltage are almost not colored and bright and those applied with voltage are deep colored, thereby producing a color display bright, clear, good in contrast, and wide in a visual field angle. Especially, the display device of the second embodiment can obtain a display which is uniform, more bright, clear, and of high quality.

As seen from the description of the embodiment of the positive display guest-host type display device using the material comprising the nematic liquid crystal with negative dielectric anisotropy, optically active material, and dichroic dye, the method of the invention can easily and reliably complete the perpendicular alignment of liquid crystal molecules at smaller tilt angles in a fixed direction and thus is not limited in application to the aforesaid guest-host type liquid crystal display device.

In other words, this invention is applicable in cases where, in order to obtain liquid crystal devices other than guest-host type (White Taylor type or electrically controlled birefringence type), the nematic liquid crystals with positive or negative dielectric anisotropy, such as Schiff base liquid crystal, biphenyl liquid crystal, azoxy liquid crystal, phenyl cyclohexane liquid crystal, and phenyl pyrimidine liquid crystal, or a mixture of these liquid crystals, or these liquid crystals containing optically active material, are required to be utilized to get the perpendicular alignment of molecules. Consequently, the method of the invention can demonstrate a superior effect.

What is claimed is:

1. In the method for the preparation of an electrode substrate for use in a liquid display device utilizing perpendicular alignment of liquid crystal and dichroic dye molecules, the improvement wherein a base substrate bearing an electrode film is coated with an insulating film on the surface which contacts the liquid crystal, rubbing the insulating film with cloth in a fixed direction and, following the rubbing treatment, treating the rubbed surface with a silane surfactant so that when the electrode substrate is employed in a liquid crystal display device the liquid crystal and dye molecules are arranged in the direction of the major axes thereof in substantially perpendicular orientation at constant tilt angles greater than 0° but less than 5° in the same direction on the interface with said electrode substrate.

2. A method according to claim 1 wherein said insulating film is an oxide compound film.

3. A method according to claim 2 wherein said oxide compound film is a silicon dioxide film.

4. A method according to claim 1 wherein said insulating film is a polyimide film.

* * * * *